(12) United States Patent
Huang

(10) Patent No.: US 6,567,191 B1
(45) Date of Patent: May 20, 2003

(54) LOCATING STRUCTURE FOR LOCATING A TRANSPARENCY ILLUMINATION MODULE ON AN OBJECT FOCAL PLANE OF A DUAL-MODE OPTICAL SCANNING DEVICE

(75) Inventor: Chih-Wen Huang, Hsinchu (TW)

(73) Assignee: Umax Data Systems Inc., Hsinchu (TW)

( * ) Notice: Subject to any disclaimer, the term of this patent is extended or adjusted under 35 U.S.C. 154(b) by 0 days.

(21) Appl. No.: 09/444,841

(22) Filed: Nov. 22, 1999

(51) Int. Cl.$^7$ .................................................. H04N 1/04
(52) U.S. Cl. ........................ 358/487; 358/497; 358/471; 358/474
(58) Field of Search ................................ 358/487, 506, 358/509, 475, 484, 497, 494, 474, 471, 400; 359/196; 399/211, 380

(56) References Cited

U.S. PATENT DOCUMENTS

| | | | | |
|---|---|---|---|---|
| 5,898,508 A | * | 4/1999 | Bekanich | 358/474 |
| 6,163,388 A | * | 12/2000 | Lee et al. | 358/488 |
| 6,185,011 B1 | * | 2/2001 | William | 358/474 |
| 6,304,358 B1 | * | 10/2001 | Lin et al. | 359/196 |
| 6,335,806 B1 | * | 1/2002 | Chiang et al. | 358/474 |

* cited by examiner

Primary Examiner—Cheukfan Lee
(74) Attorney, Agent, or Firm—Bacon & Thomas, PLLC (57) ABSTRACT

A locating structure for a dual-mode optical scanning device including a transparency scanning mode and a reflective scanning mode is disclosed. The locating structure includes at least one locating posts formed on a bottom surface of the transparency illumination module and at least one locating holes formed on an object focal plane of the scanner frame corresponding to the locating posts. When the transparency illumination module is closed onto the scanner frame, by means of the locating structure, the deflection between the transparency illumination module and the scanner frame can be limited, so as to accurately locate the transparency illumination module on the scanner frame and enhance the quality of scanned image.

8 Claims, 8 Drawing Sheets

LOCATING STRUCTURE FOR LOCATING A TRANSPARENCY ILLUMINATION MODULE ON AN OBJECT FOCAL PLANE OF A DUAL-MODE OPTICAL SCANNING DEVICE

BACKGROUND OF THE INVENTION

1. Field of the Invention

The present invention relates to a locating structure for an optical scanning device, and more particularly to a locating structure for locating a transparency illumination module on an object focal plane of a scanner frame of a dual-mode optical scanning device.

2. Description of the Prior Art

Recently, optical scanning devices have been widely used by various users in various fields. There are many different types of scanners on market, such as hand-held scanner, scanner, transparency type scanner, and reflective type scanner. In order to meet requirements in practical use, a dual-mode optical scanning device combining reflective and transparency scanning modes has been developed.

Figure 1:
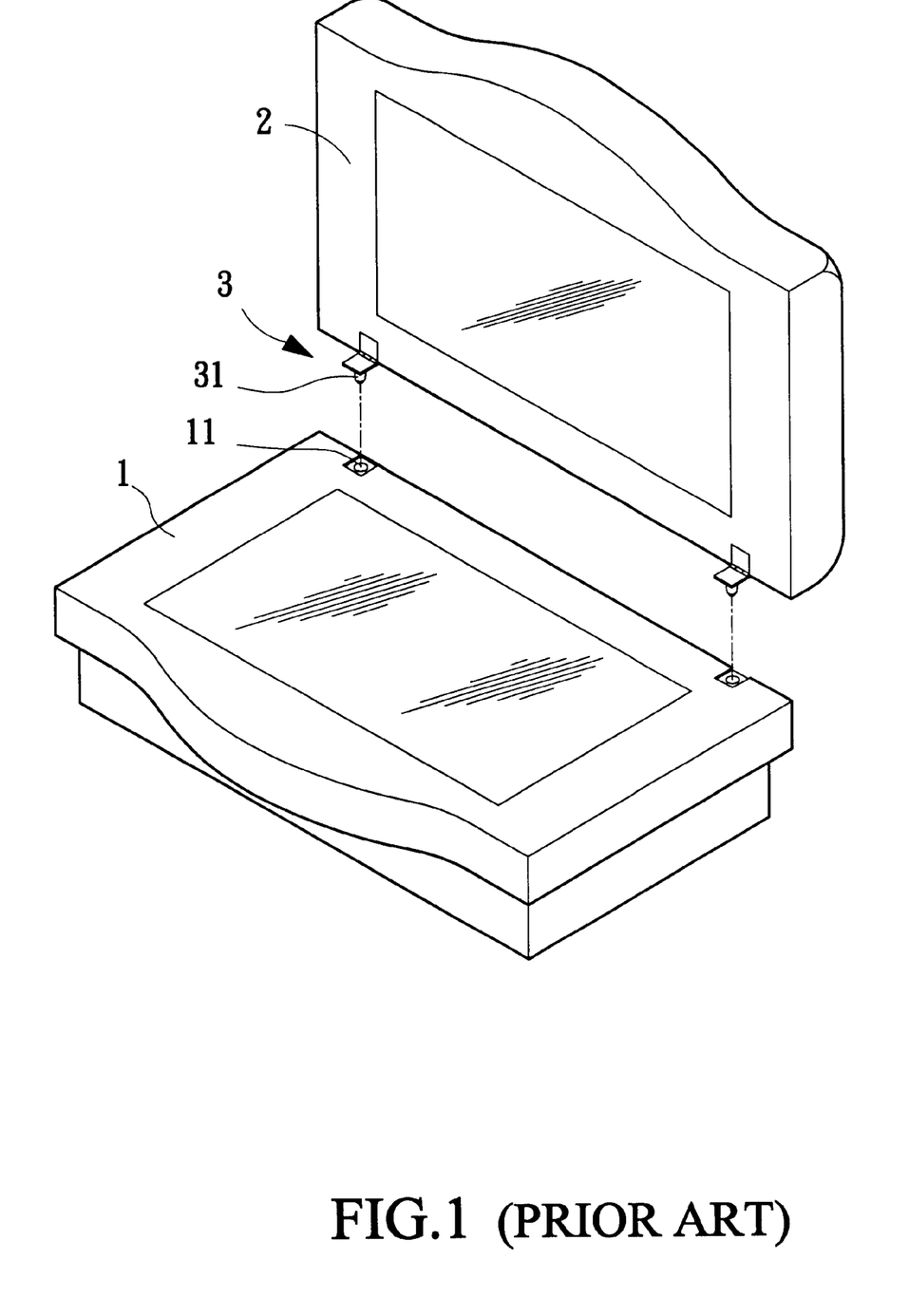
FIG. 1 is a perspective view of a conventional dual-mode optical scanning device including a reflective type scanner frame and a transparency illumination module detachable from the scanner frame.

FIG. 1 shows an exploded view of a conventional dual-mode optical scanning device comprising a reflective type scanner frame 1 and a transparency illumination module 2. The transparency illumination module 2 and the reflective type scanner frame 1 are combined in such a manner that the rear edges thereof are pivotally detachably connected by a pair of known pivot members 3. Each pivot member 3 includes a mounting rod 31 projecting from a bottom plate of the pivot member 3. A pair of shaft hole 11 are formed on the scanner frame 1 corresponding to the mounting rods 31. The mounting rod 31 is snugly fitted into the shaft hole 11, whereby the transparency illumination module 2 can be turned open about the pivot members 3 with respect to the scanner frame 1 and detachable from the scanner frame 1.

The scanner frame 1 includes a lighting source device, a traveling mechanism, and a transmission mechanism therein for scanning a reflective original document placed on the document positioning plane or object focal plane which is a top plane surface made of for example glass or other light transmittable, substantially rigid material, for supporting a document to be scanned (not shown), defining a document scanning widow.

The transparency illumination module 2 includes a back lighting source device, a traveling mechanism, and a transmission mechanism therein for scanning a transparent original document placed on the top plane surface of the scanner frame 1. A focusing lens and an image sensing device (such as Charge Coupling Element CCD) are arranged in the scanner frame 1 for receiving the scanning light beam emitted from the back lighting source device of the transparency illumination module 2 or the lighting source device arranged in the reflective type scanner frame 1.

In reflective scanning mode, a reflective original document (not shown) is placed with the surface containing the original to be scanned facing down on a transparent surface or an object focal plane of the scanner frame 1. A simple flipcover (not show) is used in reflective scanning mode to hold the reflective original document flat on the transparent surface.

The transparent surface on the scanner frame 1 is illuminated from below by lamps, producing a scan line having a scan line axis, wherein the lamps are disposed substantially parallel to the scan line axis. The scanning optics and sensor electronics are located in scan module, which is driven together with lamps such as to move the scan line from one end of the original document to the other end of the original document.

In transparency scanning mode, the flipcover used in reflective scanning mode is replaced by the transparency illumination module 2. An illumination system, shown in the drawing as lamp 126, is disposed so as to illuminate scan line 113 of the transparent original document 124 from above along scan line axis, thereby allowing scanning of the illuminated transparent original document 124 by the scan module.

Figure 2:
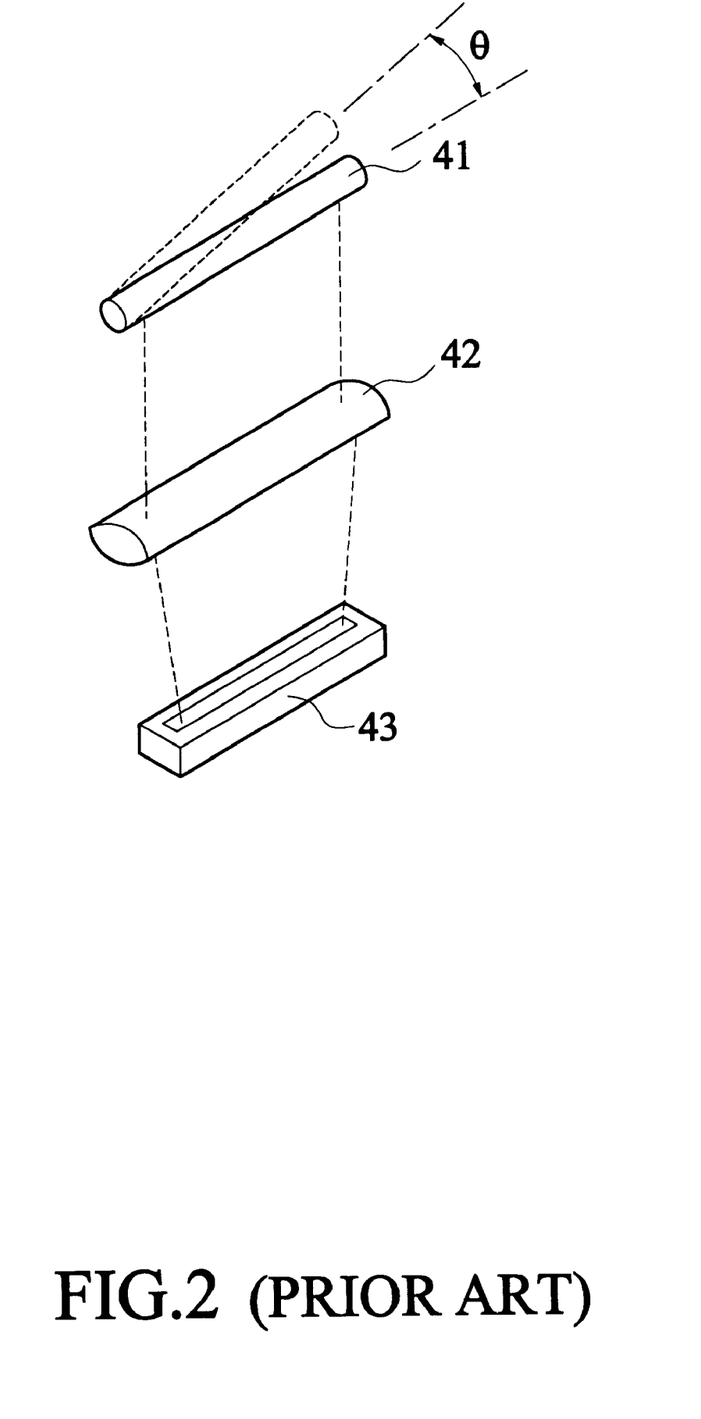
FIG. 2 illustrates that the lighting source device is possible to be deflected in the conventional dual-mode optical scanning device.

The pivot members 3 not only connect the transparency illumination module 2 and the scanner frame 1 with each other, but also locate both. With reference to FIG. 2, in case that the transparency illumination module 2 is accurately located on the scanner frame 1, the scan line emitted from the back lighting source device 41 in the transparency illumination module 2 will substantially project to the image sensing device 43 through the focusing lens 42 arranged in the scanner frame 1 without deflection angle.

However, according to the conventional connection structure as shown in FIG. 1, when the transparency illumination module 2 is closed onto the scanner frame 1, the back lighting source device 41 of the transparency illumination module 1 can hardly parallel to the focusing lens 42 and the image sensing device 43 and they often contain a deflection angle θ (as shown by phantom lines). In transparency scanning mode of the scanner, this deflection angle will make a part of the scan line emitted by the back lighting source device 41 unable to through the focusing lens 42 accurately project onto the image sensing device 43. This will affect the quality of image scanning. Such situation more frequently takes place in a relatively large size document scanning operation (such as standard A3 size original document).

Thus, it is desirable to provide a locating structure which is capable of overcoming the problems described above.

SUMMARY OF THE INVENTION

It is therefore a primary object of the present invention to provide a locating structure for a dual-mode optical scanning device which can be operated in a reflective scanning mode and a transparency scanning mode.

It is a further object of the present invention to provide a locating structure for locating a transparency illumination module on a top plane of a reflective type scanner frame, so as to more accurately control the relative displacement between the transparency illumination module and the scanner frame.

To achieve the above objects, in accordance with the present invention, there is provided a locating structure comprising at least one locating post projecting from a bottom surface of the transparency illumination module and facing a top surface of the reflective type scanner frame, and at least one locating hole formed on the top plane of the scanner frame and corresponding to the locating post. The locating posts clan be replaced by curved protrusions, and the locating holes can be replaced by concave portions corresponding to the curved protrusions.

To further understand the present invention, reference is made to the following detailed description of a preferred embodiment of the present invention, as well as the attached drawings, wherein:

DETAILED DESCRIPTION OF THE PREFERRED EMBODIMENTS

Figure 3:
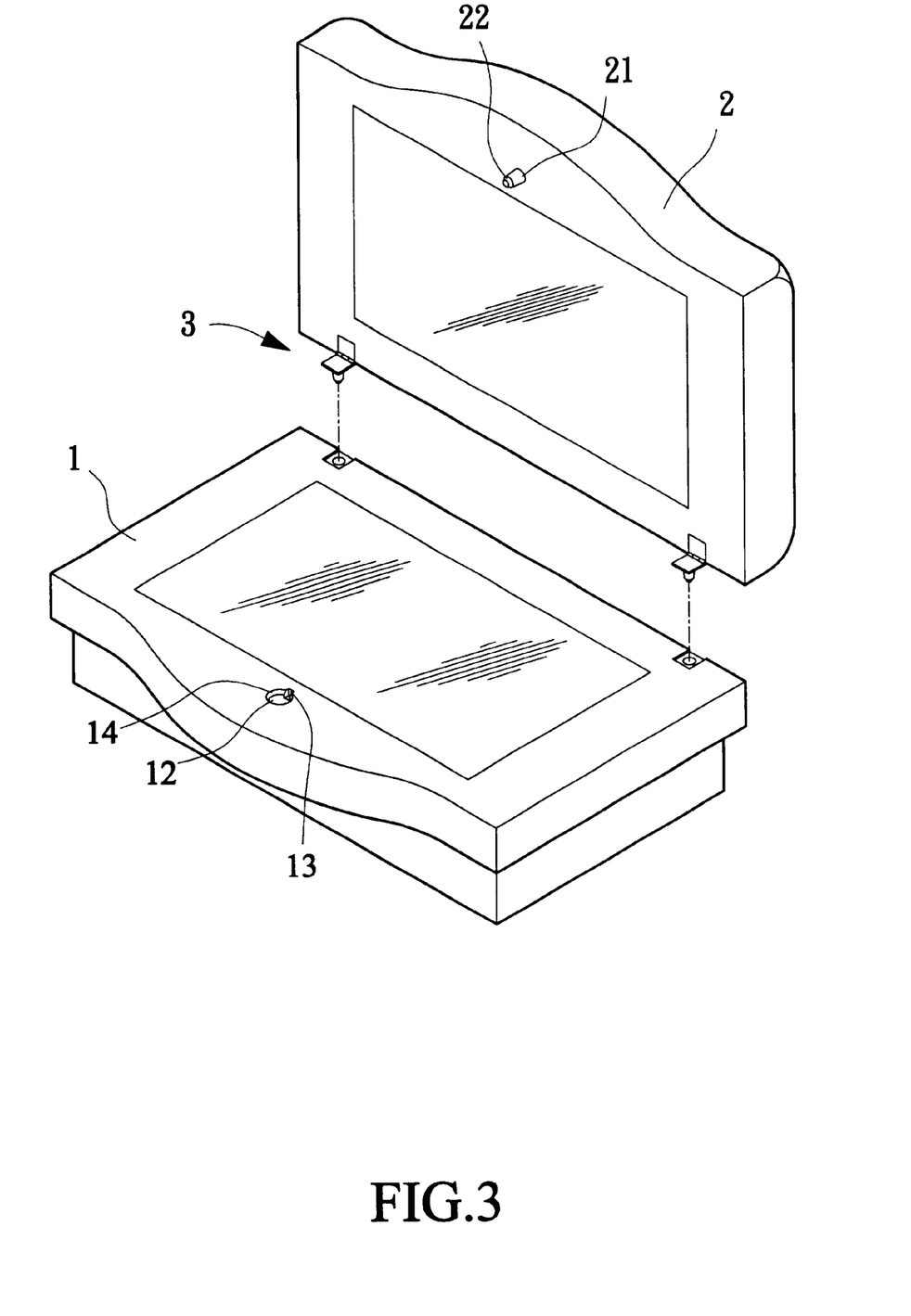
FIG. 3 is a perspective view of a first embodiment of the present invention.

Please refer to FIG. 3 which shows a first embodiment of the locating structure for a dual-mode optical scanning device in accordance with the present invention. The dual-mode optical scanning device comprises a reflective type scanner frame 1 and a transparency illumination module 2. The transparency illumination module 2 and the reflective type scanner 1 are joint in such a manner that the rear edges thereof are pivotally detachably connected by a pair of pivot members 3, so that the transparency illumination module 2 can be turned open about the pivot members 3 and detachable from the scanner frame 1.

The reflective type scanner frame 1 includes a lighting source device, a traveling mechanism, and a transmission mechanism therein for scanning a reflective original document placed on the document positioning plane or object focal plane which is mounted on the scanner frame 1.

The transparency illumination module 2 includes a back lighting source device, a traveling mechanism, and a transmission mechanism therein for scanning a transparent original document placed on the top plane surface of the scanner frame 1. A focusing lens and an image sensing device (such as Charge Coupling Element CCD) are arranged in the scanner frame 1 for receiving the scanning light beam emitted from the back lighting source device of the transparency illumination module 2 or the lighting source device arranged in the reflective type scanner frame 1.

As shown in FIG. 3, a locating post 21 is formed on a bottom surface of the transparency illumination module 2, opposite to the top plane surface of the scanner frame 1 and distal from the pivot member 3. Preferably, the top end of the locating post 21 is formed with a suitable guide angle 22.

The scanner frame 1 is formed with a locating hole 12 corresponding to the locating post 21 formed on the transparency illumination module 2. The top edge of the locating hole 12 is formed with a guide angle 13 corresponding to the guide angle 22 of the locating post 21.

Accordingly, when the transparency illumination module 2 is closed onto the reflective type scanner frame 1, the locating post 21 of the transparency illumination module 2 is just fitted into the locating hole 12 of the scanner frame 1. The diameter of the locating hole 12 is somewhat larger than that of the locating post 21 such that the locating post 21 can be snugly received in the locating hole 12.

By means of the locating post 21 and the corresponding locating hole 12, the deflection of the transparency illumination module 2 with respect to the scanner frame 1 can be effectively limited.

Further, the top edge of the locating hole 12 is formed with a concave section 14. The concave section 14 formed on the locating hole 12 prevents the locating post 21 from being obstacled by the periphery of the locating hole 12 during closing or opening the transparency illumination module 2.

Figure 4:
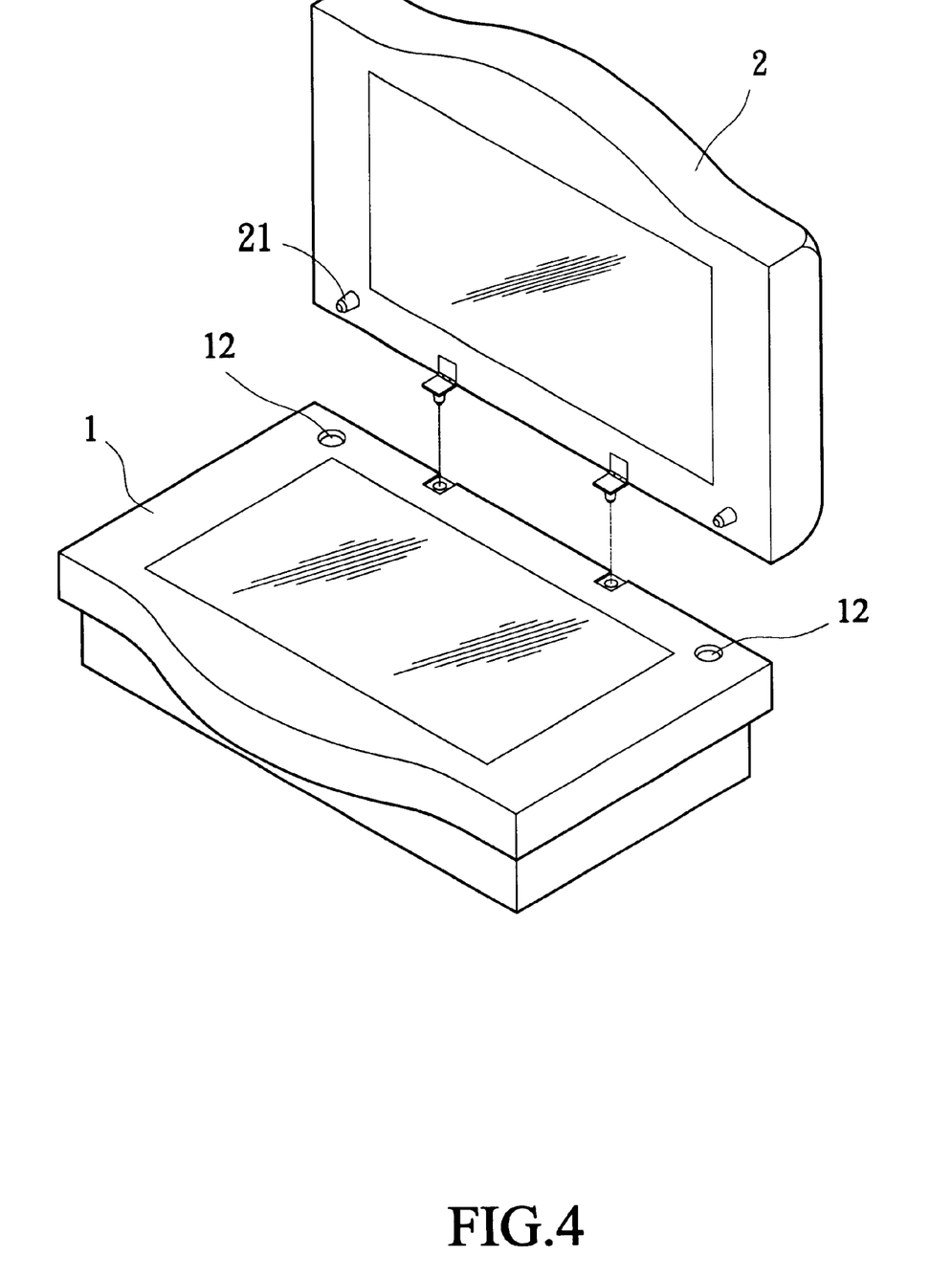
FIG. 4 is a perspective view of a second embodiment of the present invention.

FIG. 4 shows a second embodiment of the present invention, in which most of the structures are identical to those of the first embodiment described above and shown in FIG. 3. The only difference between the second and the first embodiments resides in that a pair of locating posts 21 are symmetrically disposed on positions near to the rear edge of the bottom surface of the transparency illumination module 2. The scanner frame 1 is formed with two locating holes 12 corresponding to the locating posts 21 of the transparency illumination module 2.

Figure 5:
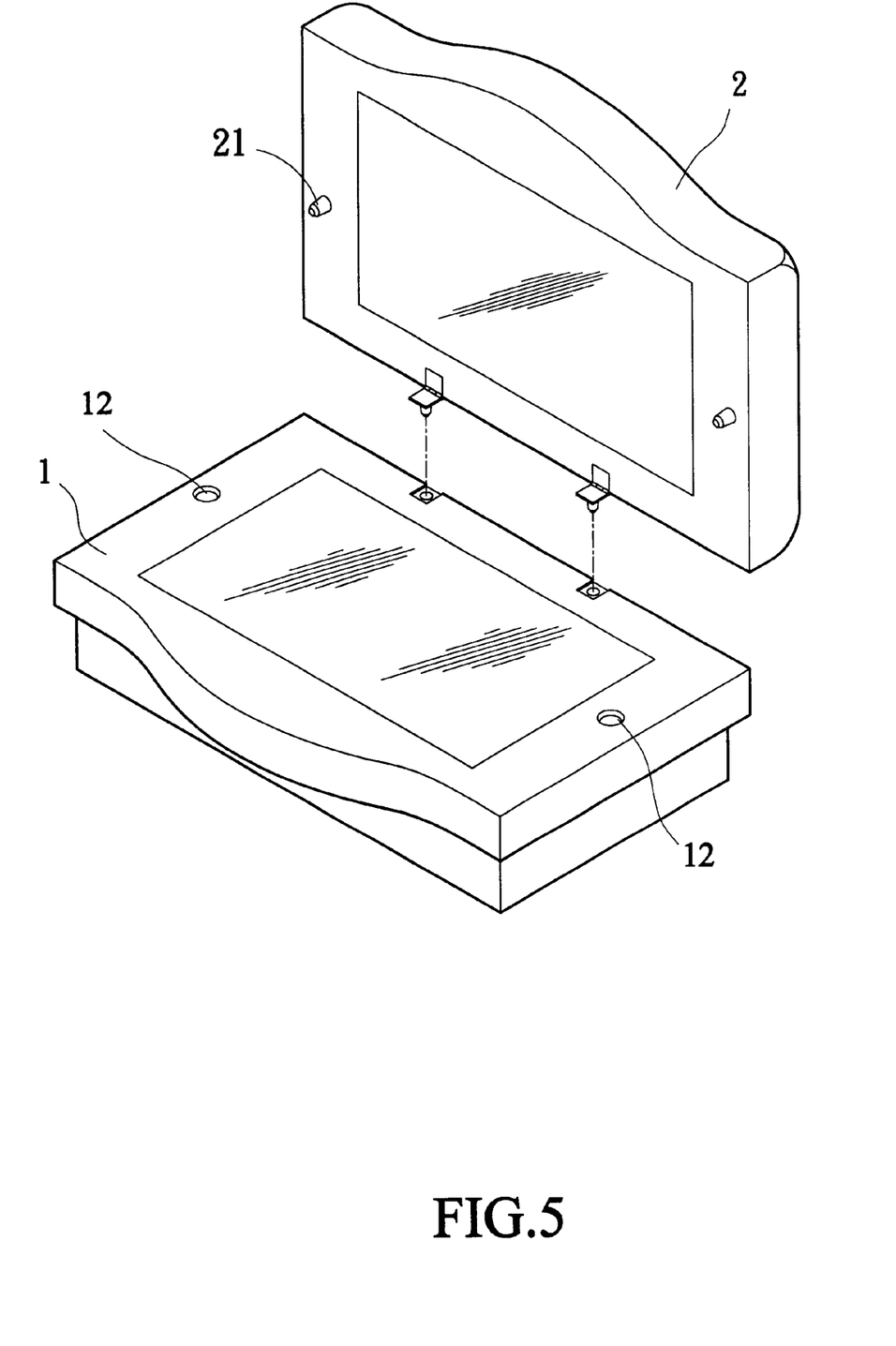
FIG. 5 is a perspective view of a third embodiment of the present invention.

FIG. 5 shows a third embodiment of the present invention, in which the locating posts 21 of the second embodiment in FIG. 4 are alternatively disposed on positions near to a left and right edges respectively of the bottom surface of the transparency illumination module 2. The reflective type scanner frame 1 is formed with two locating holes 12 corresponding to the locating posts 21 of the transparency illumination module 2.

By means of the locating posts 21 and corresponding locating holes 12 of the embodiments as shown in FIGS. 4 and 5, the deflection of the transparency illumination module 2 with respect to the scanner frame 1 can be also effectively, limited.

Figure 6:
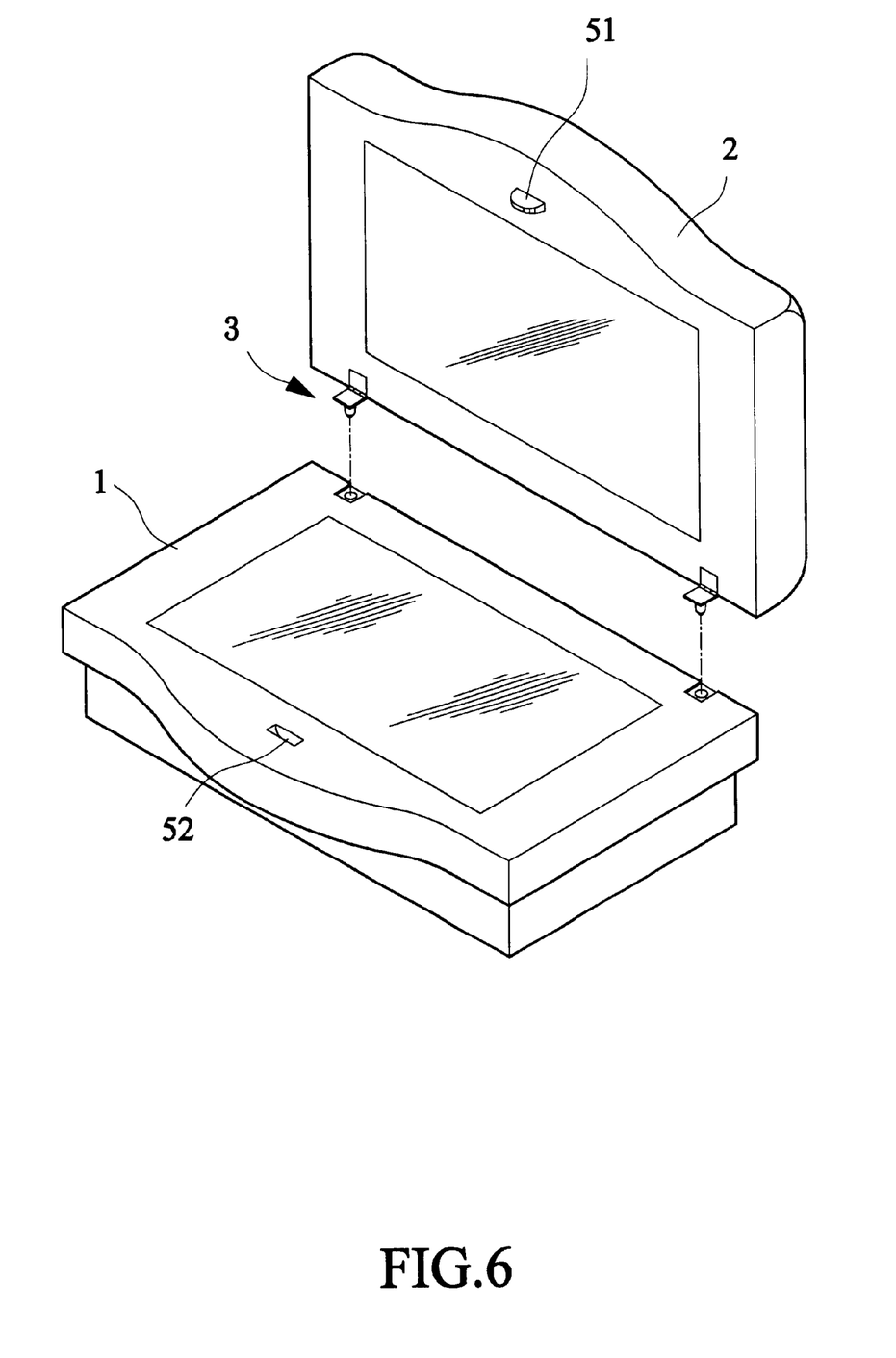
FIG. 6 is a perspective view of a fourth embodiment of the present invention.

FIG. 6 shows a fourth embodiment of the present invention, in which most of the structures are identical to those of the first embodiment described above and shown in FIG. 3. The differences between the fourth and the first embodiments resides in that the locating post 21 formed on the transparency module 2 of the first embodiment is replaced by a curved protrusion 51, and the locating hole 12 formed on the top plane surface of the scanner frame 1 of the first embodiment is replaced by a concave potion 52 in the fourth embodiment.

When the transparency illumination module 2 is closed onto the scanner frame 1, the curved protrusion 51 of the transparency illumination module 2 is just fitted into the concave portion 52 of the scanner frame 1. The diameter of the concave portion 52 is somewhat larger than that of the curved protrusion 51 such that the curved protrusion 51 can be snugly received in the concave portion 52.

By means of the curved protrusion 51 and the corresponding concave portion 52, the deflection of the transparency illumination module 2 with respect to the scanner frame 1 can be effectively limited.

Figure 7:
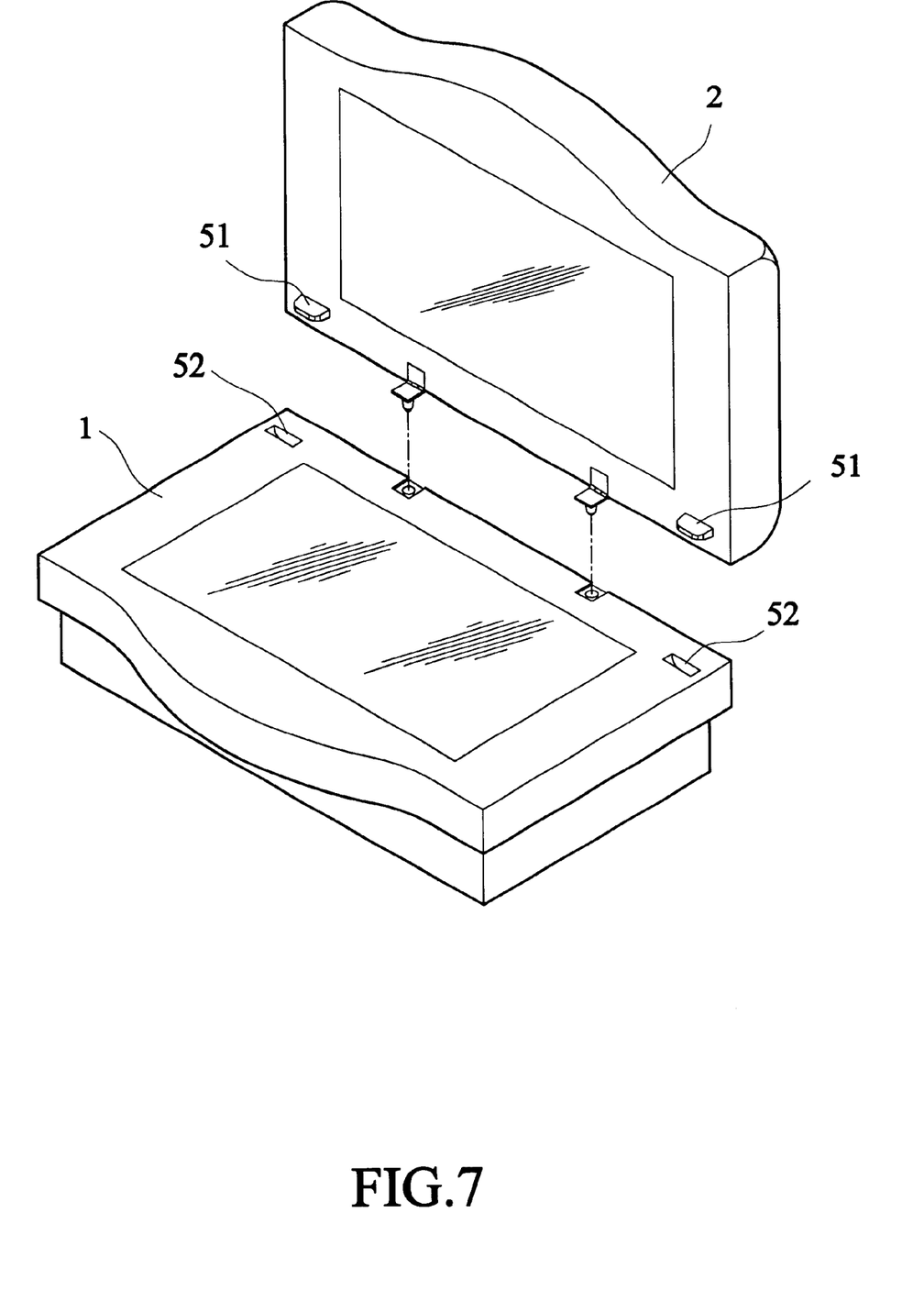
FIG. 7 is a perspective view of a fifth embodiment of the present invention.

FIG. 7 shows a fifth embodiment of the present invention, in which most of the structures are identical to those of the forth embodiment shown in FIG. 6. The only difference between the fifth and the fourth embodiments resides in that a pair of curved protrusions 51 are symmetrically disposed on positions near to the rear edge of the bottom surface of the transparency illumination module 2. The scanner frame 1 is formed with two concave portions 52 corresponding to the curved protrusions 51 of the transparency illumination module 2.

Figure 8:
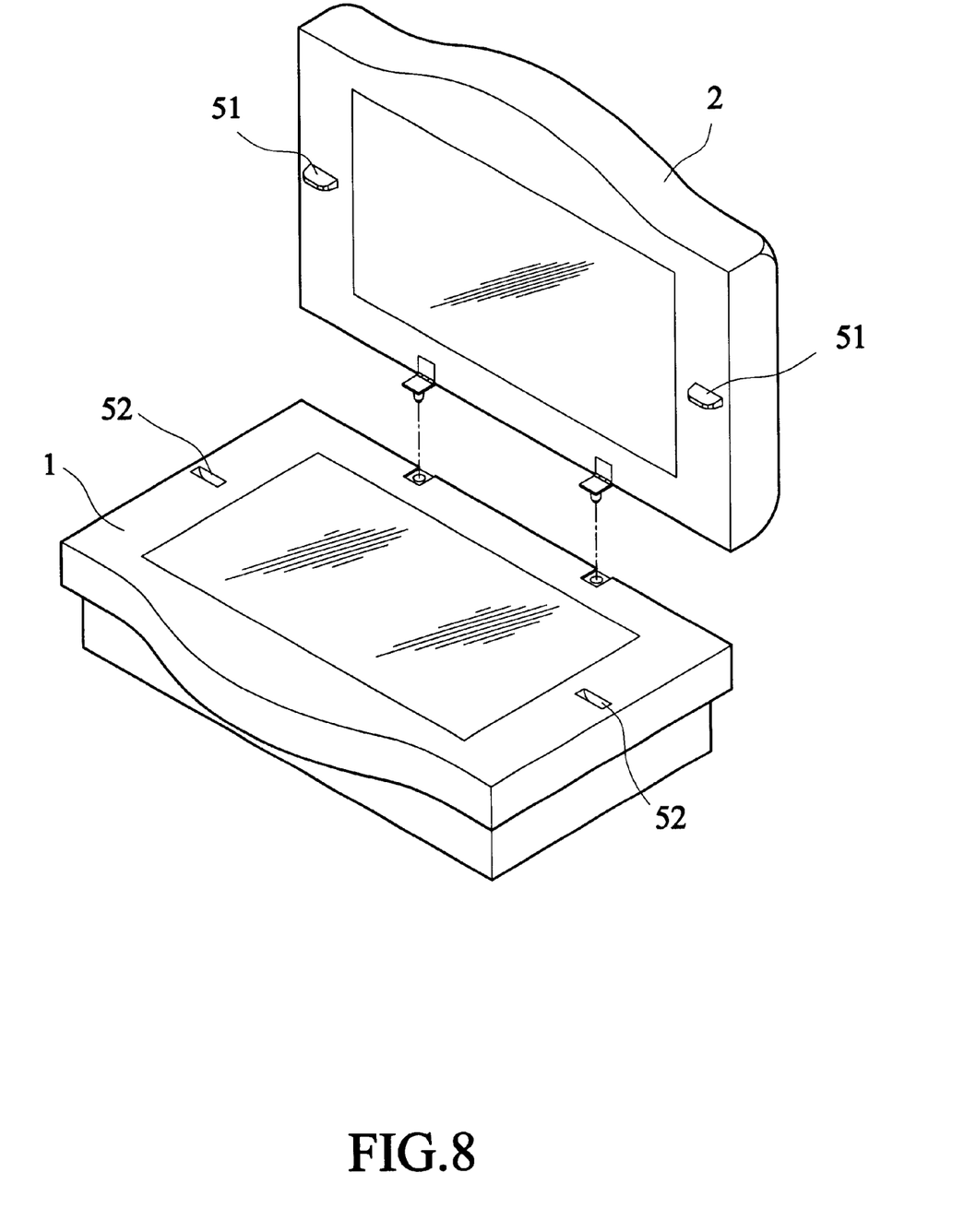
FIG. 8 is a perspective view of a sixth embodiment of the present invention.

FIG. 8 shows a sixth embodiment of the present invention, in which the curved protrusions 51 of the second embodiment in FIG. 7 are alternatively disposed on positions near to a left and right edges respectively of the bottom surface of the transparency illumination module 2. The scanner frame 1 is formed with two concave portions 52 corresponding to the curved protrusions 51 of the transparency illumination module 2.

By means of the curved protrusions 51 and corresponding concave portions 52 of the embodiments as shown in FIGS. 7 and 8, the deflection of the transparency illumination module 2 with respect to the scanner frame 1 can be also effectively limited.

Although the preferred embodiments of the present invention have been described to illustrate the present invention, it is apparent that changes and modifications in the specifically described embodiments can be carried out without departing from the scope of the invention which is intended to be limited only by the appended claims.

What is claimed is:

1. A locating structure for locating a transparency illumination module on an object focal plane formed on a top plane surface of a reflective type scanner frame of a dual-mode optical scanning device, the transparency illumination module and the reflective type scanner frame respectively having a front edge, a rear edge, a left side edge and a right side edge, a plurality of pivot members being pivotally connected between the rear edges of the transparency illumination module and the reflective type scanner frame, the locating structure comprising:

at least one locating post projecting from a bottom surface of the transparency illumination module; and at least one locating hole formed on the object focal plane of the reflective type scanner frame and facing the bottom surface of the transparency illumination module, corresponding to the locating post of the transparency illumination module; and wherein the locating post is formed with a guide angle at top end thereof.

2. The locating structure as claimed in claim 1, wherein the locating post is disposed on a position near to the front edge of the bottom surface of the transparency illumination module and the locating hole is formed on the top plane surface of the scanner frame corresponding to the position of the locating post.

3. The locating structure as claimed in claim 1, wherein the locating post is disposed on a position near to the rear edge of the bottom surface of the transparency illumination module and the locating hole is formed on the top plane surface of the scanner frame corresponding to the position of the locating post.

4. The locating structure as claimed in claim 1, wherein a pair of locating posts are disposed on a position near to the left side edge and the right side edge of the bottom surface of the transparency illumination module respectively and a pair of locating holes are formed on the top plane surface of the scanner frame corresponding to the position of the locating posts.

5. A locating structure for locating a transparency illumination module on an object focal plane formed on a top plane surface of a reflective type scanner frame of a dual-mode optical scanning device, the transparency illumination module and the reflective type scanner frame respectively having a front edge, a rear edge, a left side edge and a right side edge, a plurality of pivot members being pivotally connected between the rear edges of the transparency illumination module and the reflective type scanner frame, the locating structure comprising:

at least one locating post projecting from a bottom surface of the transparency illumination module; and at least one locating hole formed on the object focal plane of the reflective type scanner frame and facing the bottom surface of the transparency illumination module, corresponding to the locating post of the transparency illumination module;

wherein the locating hole is formed with a guide angle at top periphery thereof.

6. The locating structure as claimed in claim 5, wherein the locating post is disposed on a position near to the front edge of the bottom surface of the transparency illumination module and the locating hole is formed on the top plane surface of the scanner frame corresponding to the position of the locating post.

7. The locating structure as claimed in claim 5, wherein the locating post is disposed on a position near to the rear edge of the bottom surface of the transparency illumination module and the locating hole is formed on the top plane surface of the scanner frame corresponding to the position of the locating post.

8. The locating structure as claimed 5, wherein a pair of locating posts are disposed on a position near to the left side edge and the right side edge of the bottom surface of the transparency illumination module respectively and a pair of locating holes are formed on the top plane surface of the scanner frame corresponding to the position of the locating posts.

* * * * *